(No Model.) 4 Sheets—Sheet 3.
S. L. HALL.
CAKE MACHINE.
No. 500,655. Patented July 4, 1893.
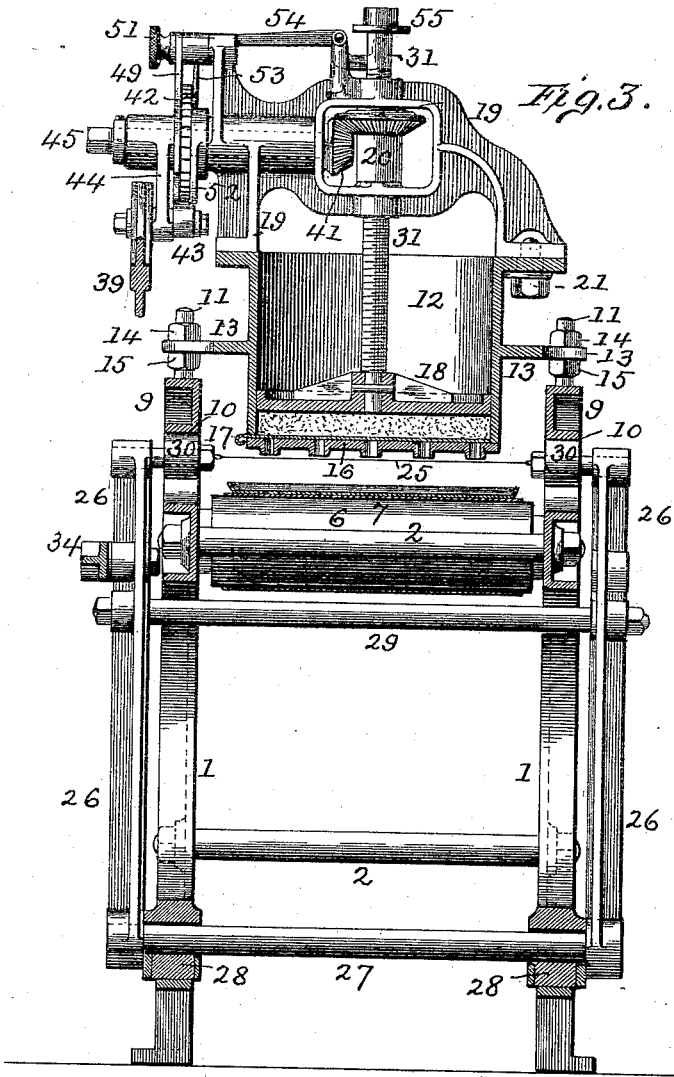
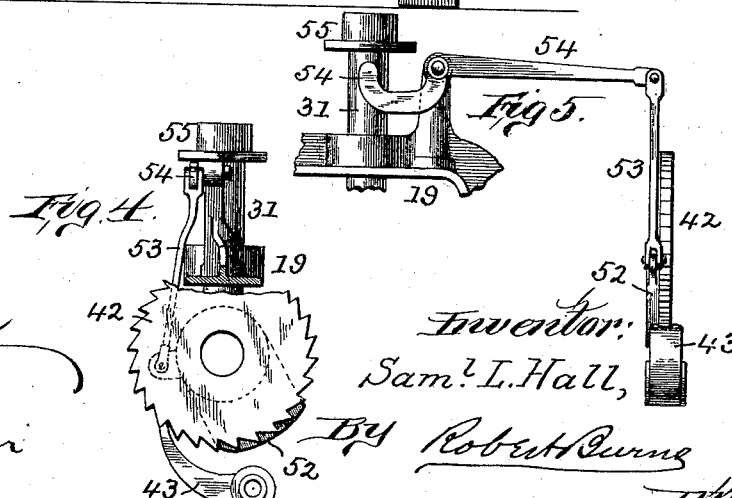

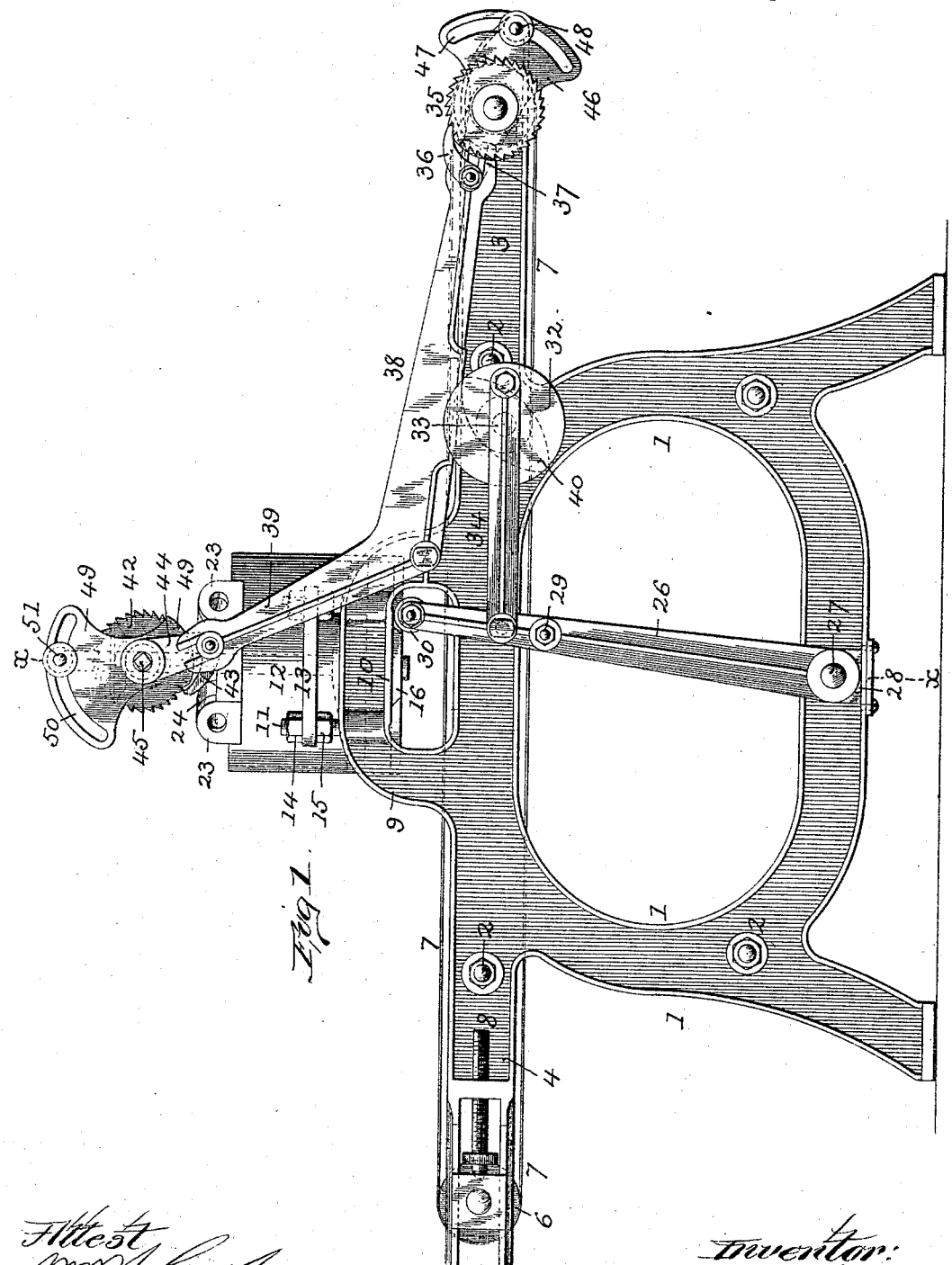

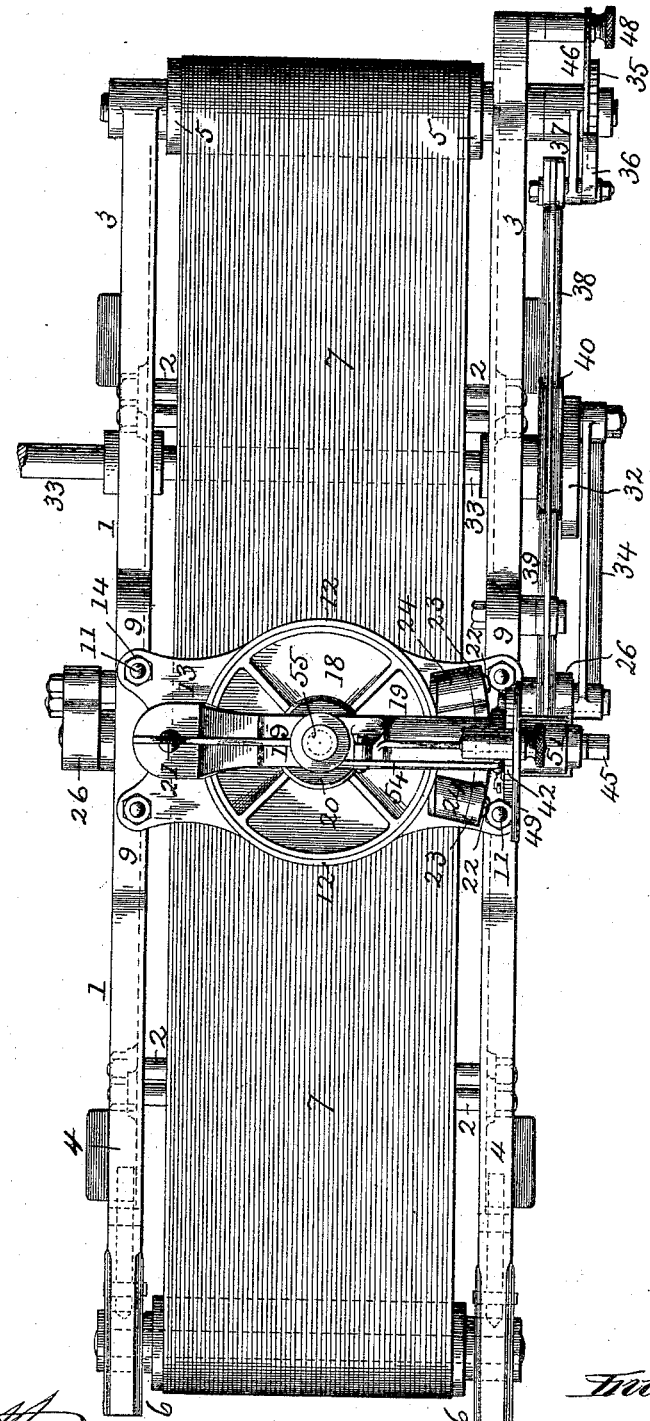

(No Model.) 4 Sheets—Sheet 4.
S. L. HALL.
CAKE MACHINE.
No. 500,655. Patented July 4, 1893.
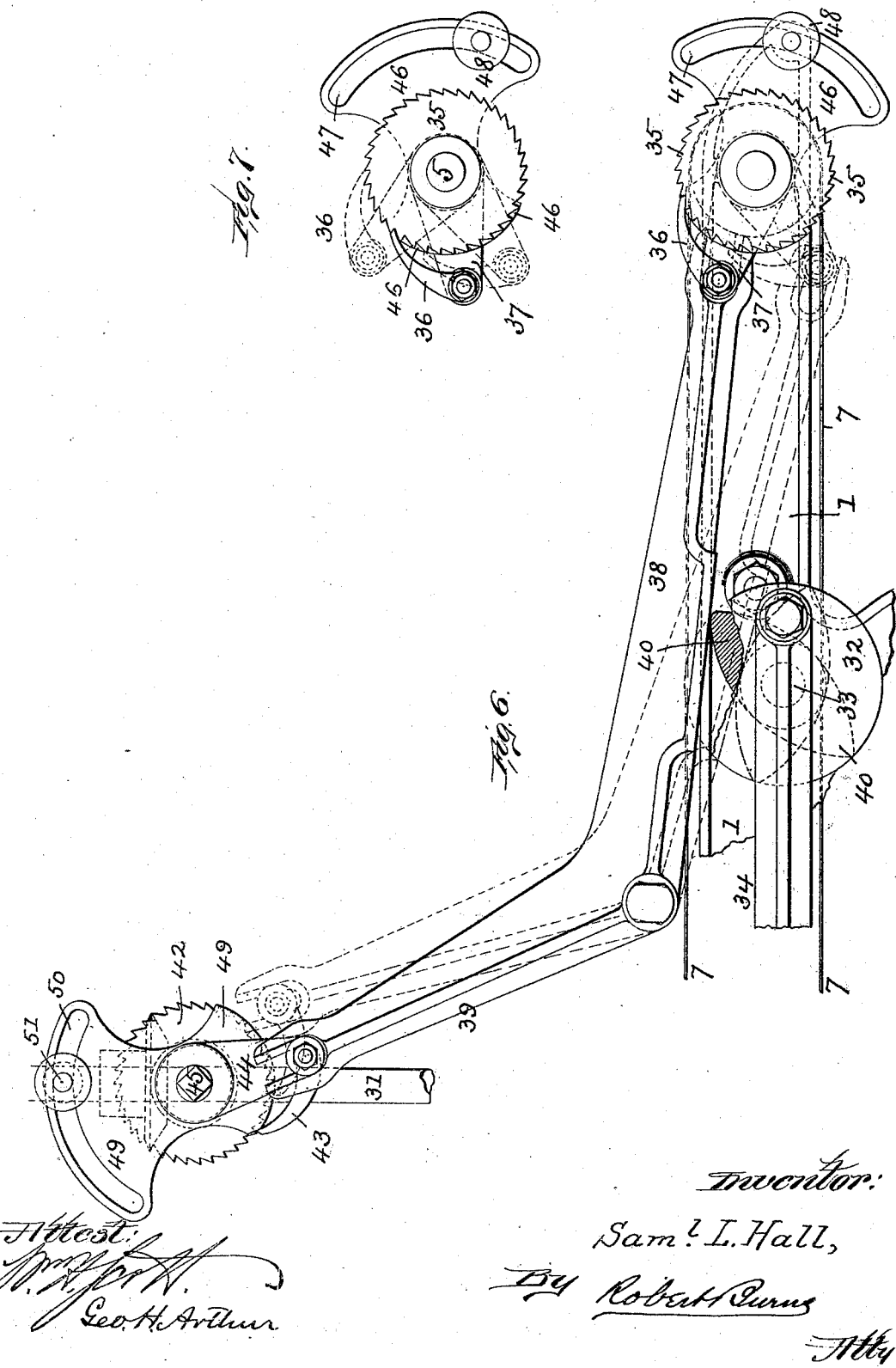
Inventor:
Sam'l L. Hall,
By Robert Burns
Atty
Attest:
Geo. H. Arthur

UNITED STATES PATENT OFFICE.

SAMUEL L. HALL, OF CHICAGO, ILLINOIS.

CAKE-MACHINE.

SPECIFICATION forming part of Letters Patent No. 500,655, dated July 4, 1893.

Application filed October 20, 1892. Serial No. 449,469. (No model.)

*To all whom it may concern:*

Be it known that I, SAMUEL L. HALL, a citizen of the United States, residing at Chicago, in the county of Cook and State of Illinois, have invented certain new and useful Improvements in Cake-Machines; and I do hereby declare the following to be a full, clear, and exact description of the same, reference being had to the accompanying drawings, forming part of this specification.

The present invention relates to that type of machines for making cakes, jumbles, snaps, &c., from soft dough, and in which the dough is intermittently forced out of a dough box or holder, through suitable orifices in the bottom of the same, the dough as it protrudes being cut into cakes, &c., by means of a reciprocating cutting device.

The present improvement has for its objects: first, to provide a simple and effective arrangement of the reciprocating cutting mechanism, whereby the cutting or cake severing operation of the same will take place on both the forward and backward movement of the same, and thus attain a two fold increase in the capacity of the machine, without any increase in the speed of the primary operating mechanism of the machine; second, to afford a durable and convenient feeding mechanism for the endless carrier belt of the machine, and with which the intermittent feed of the same at stated intervals in the operation of the machine is accomplished automatically, as well as which is capable of ready and convenient adjustment by hand to regulate the amount of intermittent motion or feed that is imparted to the endless carrier belt, the requirement in this connection being a very short feed for small cakes, and a corresponding length of feed for any increase in the size of the cakes that are being made; third, to afford a simple and effective operating mechanism for the plunger or follower of the dough box, that is capable of ready and convenient adjustment, so as to move the follower and feed the dough at a speed corresponding with the size of the cake being cut, and corresponding movements of kindred parts of the machine; fourth, to provide a simple and effective arrangement of the means for supporting the dough box, so that the same is capable of ready adjustment in the operation of leveling the dough box, and adjusting the same to bring the faces of the molds or dies in proper position relative to the cutting knife or wire; fifth, to afford a simple and durable pivotal attachment for the arch frame carried by the dough box plunger and its operating gearing, so that the same can be swung back clear of the dough box, leaving free and clear access to such box in the operation of cleaning and refilling the same; such operation can only be effected when the plunger is out of the dough box in its fully elevated position, and the plunger, its operative mechanism, and the arch frame swing together bodily around out of the way; sixth, to provide an improved safety mechanism, whereby a further movement of the operating mechanism of the dough box plunger is checked and stopped when said plunger reaches a predetermined position adjacent to the bottom of the dough box, and by this means avoid any liability of an excessive downward movement of the plunger and a consequent breakage of the parts. I attain such objects by the construction and arrangement of parts illustrated in the accompanying drawings, in which—

Figure 1, is a side elevation of a cake machine embodying my present improvements; Fig. 2, a top plan of the same; Fig. 3, a transverse sectional elevation of the machine at line $x$—$x$, Fig. 1; Fig. 4, a detail side elevation illustrating the automatic stop mechanism of the dough trough plunger; Fig. 5, a detail end elevation of the same, at right angles to Fig. 4; Fig. 6, an enlarged side elevation partly sectionized of the operating mechanisms of the endless carrier belt and the dough box plunger; and Fig. 7, a similar view of the adjustable pawl and ratchet mechanism of the endless carrier belt.

Similar numerals of reference indicate like parts in the several views.

As represented in the drawings the main frame of the machine consists of two side standards 1, connected together by cross stays or bolts 2, and having horizontally projecting end wings or extensions 3 and 4, provided with suitable boxes in which are journaled the carrying drums 5 and 6 of the endless carrier apron 7 of the machine. The boxes for the driving drum 5 are stationary, while the boxes of the idler or tightener drum 6 are made longitudinally adjustable by adjusting screws 8, so as to afford the proper tension to the carrier belt or apron 7.

9, is a centrally arranged arched formation on each of the side standards, provided with a straight guide or track 10 for the cake cutting mechanism, as hereinafter set forth, and with bosses or sockets for the pairs of screw-threaded studs 11 that support the dough box 12 in position, such studs passing through lateral flanges or lugs 13 on the sides of the dough box and having top and bottom nuts 14 and 15, by which the dough box is secured at any desired adjustment. The dough box 12, will consist of an open-topped marginally flanged cylinder, the bottom of which is provided with the usual foraminous die plate 16, and slide or plate 17 for closing the die openings, as usual in the present type of machines.

18, is the vertically moving piston or follower of the dough box, the rod 31 of which is guided in the arched bracket frame 19, and is screw threaded so as to be engaged by the rotary nut 20, having bearing between upper and lower branches of the frame 19, and which by its rotation is adapted to impart either an upward or downward motion to the plunger in accordance with the direction of rotation.

In order to prevent a turning movement of the piston or follower within the dough box, the friction of the same against the inner periphery of the dough box, as well as upon the surface of the dough may be relied upon, but where positive means is desired, the usual well known longitudinal slot may be formed in the screw threaded piston rod, which is engaged by a spline or feather on the arched bracket frame 19. The arched bracket frame 19, is pivoted at one side to the dough box by means of its single attaching bolt 21, and at the opposite side is engaged by a pair of tangential set screws 22 that pass through stationary lugs 23 on the dough box, into corresponding lugs 24 on the arch frame, as shown in Figs. 1 and 2, the purpose of this construction being to admit of the arched frame, and the operating mechanism supported thereon, being swung bodily to one side, so as to admit of free and convenient access to the dough box in cleaning and filling the same.

The vibrating dough cutting mechanism, consists of a transversely extending wire 25, stretched between the upright side arms 26 of the vibrating cutter frame, that are pivoted at their lower ends by means of their transversely extending connecting shaft 27, and capable of a limited vertical movement in the main frame 1, upon elastic cushions 28.

29, are intermediate transverse braces by which the upright side arms 26 are braced and stiffened; the upper ends of the side arms 26, are provided with laterally projecting track rollers or wheels 30, that bear against straight horizontal tracks 10 formed on the under sides of the arched formations 9 of the main side standards 1 of the machine, the purpose being to cause the cutting wire, which extends between the axes of such rollers or wheels, to have a rectilinear reciprocation in a horizontal plane immediately beneath the dough orifices in the die plate 16, the elastic cushions 28, heretofore described, affording a yielding abutment to admit of the vibration of the upper end of the arms 26 in a straight line.

A vibratory motion is communicated to the cutter frame, by a crank disk 32, on the main driving shaft 33 of the machine, by means of a pitman connection 34 between the crank pin and one of the upright arms 26 of the cutter frame, as illustrated in Figs. 1, 2 and 6.

An intermittent feeding motion of the endless carrier belt or apron 7, is effected by the following mechanism: 35, is a ratchet wheel on the shaft of the driving drum 5, that is engaged by a concentrically moving dog 36, pivoted to the outer end of an arm 37 journaled on the drum shaft, the pivot pin of which projects laterally and is engaged by the forked end of one arm 38 of the operating bell crank lever, the other arm 39 of which imparts an intermittent feed motion to the dough box plunger, as hereinafter described. Said bell-crank lever is pivoted to one of the main standards of the machine, and receives motion from a double ended cam 40, on the main driving shaft 33 of the machine, so as to impart two movements to the bell-crank on each revolution of the main driving shaft. The intermittent feeding motion of the dough box plunger is effected by a gear formation on the operating nut 20, that gears with and is driven by a bevel pinion 41 on a counter-shaft arranged in bearings in the arched bracket frame 19, and provided on its outer end with a ratchet wheel 42, that is engaged by a concentrically moving dog 43, pivoted to the outer end of an arm 44 journaled on the counter-shaft, the pivot pin of which projects laterally and is engaged by the forked end of the oblique arm 39 of the operating bell-crank lever heretofore described. The outer end 45 of the counter-shaft is squared for the reception of a suitable hand crank, by which a reverse motion can be imparted to the feeding mechanism to lift the piston or plunger out of the dough box.

In order to regulate the amount of feed of the two ratchet mechanisms just described and as a sequence thereto the dough and apron feeding mechanisms of the machine, I pivotally arrange on the shaft of the driving drum 5 of the endless carrier apron, a circularly adjustable plate 46 one end of which is sector shaped and concentric with the outer diameter of the ratchet wheel 35 and laterally adjacent to the same, so as to form a raised concentric track underneath the point of the operating dog or pawl 36, to hold the same from engagement with the teeth of the ratchet wheel; the point of the dog or pawl 36 being made of sufficient width to encompass both the ratchet teeth and the adjustable plate; the other end of the plate is provided with a concentric slot 47 through which passes a clamping screw 48, that screws into the main frame of the machine, to clamp and hold the adjustable plate 46 at the required adjustment. By the adjustment of the plate 46, the engagement of the operating dog or pawl 36 with the ratchet wheel 35 can be entirely prevented, and the movement of the endless carrier belt entirely stopped, and likewise the amount of engagement of said pawl or dog with the ratchet wheel can be gaged and regulated, so as to attain any desired movement of said carrier belt up to the maximum. A similar mechanism will be employed to regulate the feed of the dough box plunger or piston. In this a plate 49 is pivotally arranged on the counter-shaft of the feed mechanism, one end being sector shaped and concentric with the outer diameter of the ratchet wheel 42, so as to form a raised concentric track upon which the pawl or dog 43 rides when it is required to diminish the dough feed, or entirely stop the same, the pawl being of a sufficient width to encompass both the ratchet wheel 42 and the plate 49, as in the other mechanism, and similarly such plate will be provided with a concentric slot 50, through which passes a clamping screw 51, that screws into the arch frame 19 to secure the adjustable plate 49 at the required adjustment.

In order to effect an automatic stop of the feeding mechanism of the dough box, when the plunger has descended, a predetermined distance therein, I provide the following automatic stop mechanism: 52, is a sector plate on the counter-shaft of the feeding mechanism, similar to plate 49, and having an outer rim concentric with the outer diameter of the ratchet wheel 42; this plate is connected by a link 53, with the outer end of a pivoted lever 54, the other end of which is in the path of an enlargement or collar 55 on the extreme upper end of the plunger or piston rod 31 of the plunger 18, the arrangement being such, that in the final downward movement of such piston or plunger the collar 55 will be brought in contact with the lever 54 to move the same, and through link 53, to draw the sector plate 52 under the point of the feeding dog or pawl 43, to render the ratchet feeding mechanism inoperative.

Having thus fully described my said invention, what I claim as new, and desire to secure by Letters Patent, is—

1. In a cake machine, the combination with an intermittently feeding dough box and a reciprocating wire cutter adapted to move in a straight line, and cut in both directions, of a vibratory cutter carrying frame, and means for allowing limited vertical movement of the same at its point of pivotal attachment to the frame of the machine, substantially as set forth.

2. In a cake machine, the combination with an intermittently feeding dough box, and a reciprocating wire cutter adapted to move in a straight line and cut in both directions, of a vibrating cutter carrying frame, a journal shaft for the same, and a yielding cushion beneath the same, substantially as set forth.

3. In a cake machine, the combination with an intermittently feeding dough box, and a reciprocating wire cutter, of a vibrating cutter carrying frame, rollers or wheels on the upper end of the same engaging a straight track on the frame of the machine, a journal shaft, and a yielding cushion beneath the same, substantially as set forth.

4. In a cake machine, the combination with an intermittently feeding dough box, and a reciprocating wire cutter, of a vibrating cutter carrying frame, rollers or wheels on the upper end of the same engaging a straight track on the frame of the machine, a journal shaft, a yielding cushion beneath the same, an operating crank disk on the main shaft, and a pitman connection, substantially as set forth.

5. In a cake machine, the combination with the dough box having lugs 23 thereon, and a plunger working therein, of the arch bracket frame 19, carrying the feeding mechanism, and pivoted at one side to the dough box by attaching bolt 21, and at the other side provided with lugs 24, to receive set screws 22, passing through lugs 23 on the dough box, substantially as set forth.

6. In a cake machine, the combination with the dough box and its feeding mechanism, and the endless carrier belt and its feeding mechanism, of the operating lever 38, one arm of which has operative connection with the dough box mechanism, and the other arm with the endless carrier mechanism, and the operating cam 40 on the main driving shaft, substantially as set forth.

7. In a cake machine, the combination with the dough box, the endless carrier belt, and its ratchet feed mechanism, of the circularly adjustable plate 46, having sector shaped end concentric with the outer diameter of the ratchet wheel 35, and a clamping screw engaging in a concentric slot 47 in said plate, substantially as set forth.

8. In a cake machine, the combination with the dough box, and its follower or piston, the rod of which is screw-threaded, of the geared nut 20, bevel pinion 41, counter-shaft supported in the arched bracket frame 19, ratchet wheel 42, dog 43, arm 44, lever 39 having a forked end and operating cam 40, on the main driving shaft, substantially as set forth.

9. In a cake machine, the combination with the dough box, its follower or piston, and its ratchet feed mechanism of a circularly adjustable plate 52, having a sector shaped end concentric with the outer diameter of the ratchet wheel 42, link connection 53, lever 54, and collar or enlargement at the upper end of the piston rod 31, substantially as set forth.

In testimony whereof witness my hand this 17th day of October, 1892.

SAMUEL L. HALL.

In presence of—
ROBERT BURNS,
GEO. H. ARTHUR.